(12) United States Patent
Morishima et al.

(10) Patent No.: US 10,718,298 B2
(45) Date of Patent: Jul. 21, 2020

(54) EXHAUST GAS RECIRCULATION SYSTEM FOR INTERNAL COMBUSTION ENGINE

(71) Applicant: TOYOTA JIDOSHA KABUSHIKI KAISHA, Toyota-shi, Aichi-ken (JP)

(72) Inventors: Akinori Morishima, Naka-gun (JP); Taku Ibuki, Susono (JP); Takeshi Goto, Miyoshi (JP); Ryo Hasegawa, Shimizu-cho (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/181,660

(22) Filed: Nov. 6, 2018

(65) Prior Publication Data

US 2019/0195175 A1    Jun. 27, 2019

(30) Foreign Application Priority Data

Dec. 27, 2017    (JP) .................................. 2017-251210

(51) Int. Cl.
| | |
|---|---|
| *F02M 26/33* | (2016.01) |
| *F02D 41/00* | (2006.01) |
| *F02M 26/17* | (2016.01) |
| *F02M 26/26* | (2016.01) |
| *F02M 26/47* | (2016.01) |

(52) U.S. Cl.
CPC ......... *F02M 26/33* (2016.02); *F02D 41/0047* (2013.01); *F02M 26/17* (2016.02); *F02M 26/26* (2016.02); *F02M 26/47* (2016.02)

(58) Field of Classification Search
CPC ........ F02M 26/33; F02M 26/47; F02M 26/26; F02M 26/17; F02D 41/0047; F02D 2200/0414; F02D 41/0077; F02D 41/0072
See application file for complete search history.

(56) References Cited

U.S. PATENT DOCUMENTS

| | | | |
|---|---|---|---|
| 2008/0172169 A1 | 7/2008 | Kuronita et al. | |
| 2012/0198839 A1* | 8/2012 | Nelson | F01N 5/02 60/605.1 |
| 2013/0133633 A1* | 5/2013 | Yamana | F02D 21/08 123/568.12 |

(Continued)

FOREIGN PATENT DOCUMENTS

| | | |
|---|---|---|
| JP | 2001-041110 | 2/2001 |
| JP | 2008-175101 | 7/2008 |

(Continued)

*Primary Examiner* — Xiao En Mo
(74) *Attorney, Agent, or Firm* — Finnegan, Henderson, Farabow, Garrett & Dunner, LLP

(57) ABSTRACT

An exhaust gas recirculation system for an internal combustion engine is provided. The exhaust gas recirculation system includes: an EGR passage configured to connect an exhaust gas passage of the internal combustion engine with an intake air passage; an EGR cooling system arranged at the EGR passage; and a control device configured to control the EGR cooling system. The control device is configured to provide feedback control of the cooling efficiency of the EGR cooling system to cause the temperature of intake gas suctioned into a cylinder of the internal combustion engine to approach a target intake gas temperature. The control device is configured to more increase the amount of change of the cooling efficiency when the flow rate of EGR gas recirculated is less.

4 Claims, 4 Drawing Sheets

(56) References Cited

U.S. PATENT DOCUMENTS

2014/0288801 A1\* 9/2014 Sasaki ................ F02D 41/0065
701/102
2016/0333829 A1\* 11/2016 Takahashi .............. F02M 26/33

FOREIGN PATENT DOCUMENTS

| JP | 2010-121554 | 6/2010 |
| JP | 2018-071357 | 5/2018 |

\* cited by examiner

EXHAUST GAS RECIRCULATION SYSTEM
FOR INTERNAL COMBUSTION ENGINE

CROSS-REFERENCE TO RELATED APPLICATION

This application is based on and claims the benefit of Japanese Patent Application No. 2017-251210, filed on Dec. 27, 2017, which is incorporated by reference herein in its entirety.

BACKGROUND

Technical Field

The present disclosure relates to an exhaust gas recirculation system for an internal combustion engine in which an exhaust gas recirculation (EGR) operation to recirculate, into an intake system, a part of the gas discharged from the internal combustion engine.

Background Art

For example, JP 2001-041110 A discloses an EGR device with an EGR cooler. This EGR device is provided with a flow-rate-ratio adjustment valve configured to adjust the flow rate ratio of the flow rate of EGR gas passing through the EGR cooler and the flow rate of EGR gas that does not pass through the EGR cooler. Moreover, this EGR device detects the temperature of EGR gas after the EGR gas that has passed through the EGR cooler is mixed with the EGR gas that does not pass through the EGR cooler, and adjusts, by providing feedback control, the opening degree of the flow-rate-ratio adjustment valve such that this temperature approaches a target EGR gas temperature.

SUMMARY

According to the technique disclosed in JP 2001-041110 A, the temperature of the EGR gas recirculated can be caused to approach the target EGR gas temperature. However, even if the temperature of the EGR gas is caused to approach the target EGR gas temperature, it is difficult to cause the temperature of intake gas that is a mixed gas of fresh air and the EGR gas to approach a target intake gas temperature. This is because the degree of change of the intake gas is associated with not only the temperature of the EGR gas but also the amount of the EGR recirculated.

Accordingly, it is conceivable to perform a control to determine, using feedback control, the flow rate ratio of the flow rate of the EGR gas passing through the EGR cooler and the flow rate of the EGR gas that does not pass through the EGR cooler, in order to cause the intake gas temperature to approach the target intake gas temperature. However, in this kind of feedback control, there is a problem in terms of the setting of a control gain. More specifically, the greater the flow rate of the EGR gas is, the greater the effects of the temperature of the EGR gas into the intake gas temperature become. Thus, if a control gain that is optimum when the flow rate of the EGR gas is greater is set in the feedback control, a change of the intake gas temperature becomes slower when the flow rate of the EGR gas is less. If, on the other hand, a control gain that is optimum when the flow rate of the EGR gas is less is set in the feedback control, there is a concern that an excess change of the intake gas temperature may occur when the flow rate of the EGR gas is greater. As just described, if a constant control gain is used in the feedback control, there is a concern that a difference in tracking performance of the feedback control may occur depending on the flow rate of the EGR gas and thus the intake gas temperature may not be controlled accurately.

The present disclosure has been made to address the problem described above, and an object of the present disclosure is to provide an exhaust gas recirculation system for an internal combustion engine that can accurately control the intake gas temperature when EGR gas is recirculated.

An exhaust gas recirculation system for an internal combustion engine according to the present disclosure includes:

an EGR passage configured to connect an exhaust gas passage of the internal combustion engine with an intake air passage;

an EGR cooling system arranged at the EGR passage.

a control device configured to control the EGR cooling system.

The control device is configured to provide feedback control of a cooling efficiency of the EGR cooling system to cause a temperature of intake gas suctioned into a cylinder of the internal combustion engine to approach a target intake gas temperature.

The control device is configured to more increase an amount of change of the cooling efficiency when a flow rate of EGR gas recirculated is less.

The control device may be configured to more increase a control gain of the feedback control when the flow rate of the EGR gas recirculated is less.

The EGR cooing system may include: an EGR cooler; a bypass passage configured to bypass the EGR cooler; and a flow-rate-ratio adjustment valve configured to adjust a flow rate ratio of a flow rate of a gas flowing through the EGR cooler and a flow rate of a gas flowing through the bypass passage. The control device may be configured to provide the feedback control of the cooling efficiency by providing feedback control of an opening degree of the flow-rate-ratio adjustment valve to cause the temperature of the intake gas suctioned into the cylinder to approach the target intake gas temperature.

The control device may be configured to more increase the amount of change of the cooling efficiency when an EGR ratio is lower.

According to the exhaust gas recirculation system for an internal combustion engine of the present disclosure, the cooling efficiency of the EGR cooling system is determined by the feedback control performed such that the temperature of the intake gas suctioned into the cylinder of the internal combustion engine is caused to approach the target intake gas temperature. Also, the greater the flow rate of the EGR gas is, the greater the effects of the temperature of recirculated EGR gas into the intake gas temperature become. According to the exhaust gas recirculation system of the present disclosure, the amount of change of the cooling efficiency is made greater when the flow rate of EGR gas recirculated is less. Therefore, the tracking performance of the actual intake gas temperature to the target intake gas temperature can be made equivalent without depending on the flow rate of the EGR gas. This kind of control makes it possible to control the intake gas temperature with a high degree of accuracy when the exhaust gas is recirculated by an EGR operation.

DETAILED DESCRIPTION

In the following, detailed embodiments to which the present disclosure is applied will be described in detail with reference to the accompanying drawings. However, the present disclosure is not limited to the following embodiments. In addition, for clarity of explanation, the following description and drawings are simplified properly.

First Embodiment

Figure 1:
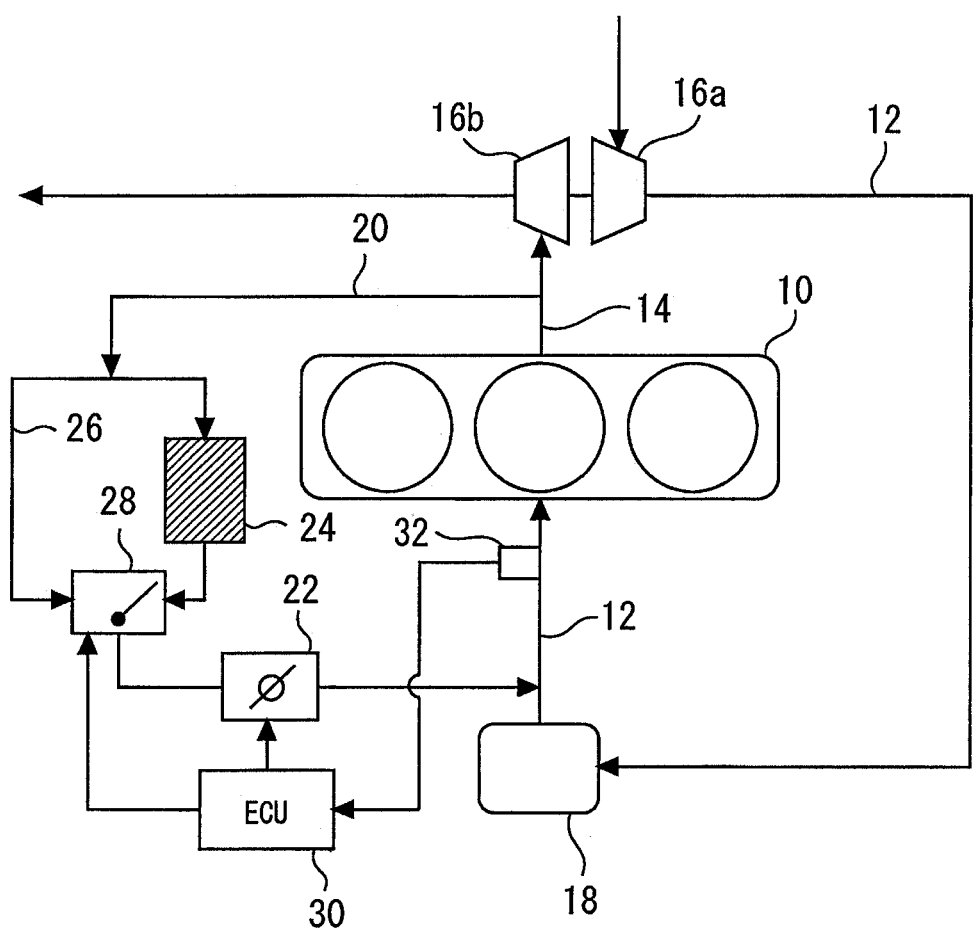
FIG. 1 is a diagram that illustrates the configuration of an engine system to which an exhaust gas recirculation system according to a first embodiment is applied.

FIG. 1 is a diagram that illustrates the configuration of an engine system to which an exhaust gas recirculation system according to the first embodiment is applied. As shown in FIG. 1, the system according to the present embodiment is provided with an internal combustion engine 10. The internal combustion engine 10 is configured as an in-line three-cylinder diesel engine that is mounted on a mobile object, such as a vehicle. However, the type of the internal combustion engine 10 and the number and arrangement of cylinders thereof are not limited to the foregoing. An intake air passage 12 and an exhaust gas passage 14 communicate with each cylinder 10.

A compressor 16a of a supercharger (more specifically, turbo-supercharger) is installed in the intake air passage 12. A turbine 16 is installed in the exhaust gas passage 14. The compressor 16a is driven by the rotation of the turbine 16b. A water-cooled intercooler 18 is installed in a portion of the intake air passage 12 located on the downstream side of the compressor 16a. A portion of the intake air passage 12 located on the downstream side of the intercooler 18 is connected with an intake manifold (not shown) of the internal combustion engine 10.

Moreover, the system according to the present embodiment is provided with an EGR passage 20 configured to connect an exhaust manifold (not shown) and a portion of the intake air passage 12 located on the downstream side of the intercooler 18. The exhaust manifold is connected with the exhaust gas passage 14. An EGR valve 22 is installed in the EGR passage 20. The EGR valve 22 is configured to adjust the amount of EGR gas recirculated into the cylinders of the internal combustion engine 10 via the EGR passage 20. An EGR cooler 24 is arranged in a portion of the EGR passage 20 located upstream of the EGR valve 22. A bypass passage 26 that bypasses the EGR cooler 24 is connected to the EGR passage 20. A flow-rate-ratio adjustment valve 28 is installed at a connecting portion at which the bypass passage 26 branched off from the EGR passage 20 is merged again with the EGR passage 20. The flow-rate-ratio adjustment valve 28 is configured to adjust the flow rate ratio of the flow rate of EGR gas flowing through the EGR cooler 24 and the flow rate of EGR gas flowing through the bypass passage 26.

Furthermore, the system according to the present embodiment is provided with an electronic control unit (ECU) 30. The ECU 30 corresponds to a control device that comprehensively controls the whole engine system. The control device according to the present disclosure is realized as a function of the ECU 30. The ECU 30 is equipped with at least an input/output interface, a memory and a CPU. The input/output interface is provided to receive sensor signals from various sensors attached to the internal combustion engine 10 and the mobile object, and also output actuating signals to various actuators of the internal combustion engine 10. The various sensors from which the ECU 30 receives signals include a temperature sensor 32 for detecting the temperature of intake gas that flows through a portion of the intake air passage 12 located on the downstream side of an EGR gas introduction portion, that is, the temperature of intake gas that is suctioned into the cylinders of the internal combustion engine 10. The various actuators to which the ECU 30 outputs actuating signals include the EGR valve 22 and the flow-rate-ratio adjustment valve 28 described above. In the memory, various control programs and maps for controlling the internal combustion engine 10 are stored. The CPU reads out a control program from the memory and executes the control program, and also generates an actuating signal on the basis of received sensor signals. It should be noted that, although a plenty of actuators and sensors that are connected to the ECU 30 are present other than those shown in FIG. 1, the description thereof is omitted in the present specification.

Engine controls performed by the ECU 30 include an EGR control. According to the EGR control of the present embodiment, the operation amount of the EGR valve 22 is determined, by the use of, for example, feedback control, such that a state quantity, such as an EGR gas flow rate or an EGR ratio that is correlated therewith, coincides with a target value that is defined on the basis of the operating state of the internal combustion engine 10, such as an engine speed and a fuel injection amount.

Moreover, the engine controls performed by the ECU 30 include an intake gas temperature control. When the EGR gas is recirculated into the cylinders, the intake gas temperature control according to the present embodiment adjusts the temperature of the EGR gas introduced into the intake air passage 12 to control the temperature of the intake gas that is suctioned into the cylinders to cause it to approach a target intake gas temperature that is defined on the basis of the operating state, such as the engine speed and the fuel injection amount.

It should be noted that the cooling efficiency of an EGR path on the side of the EGR cooler 24 is higher than that of an EGR path on the side of the bypass passage 26. Accordingly, to adjust the intake gas temperature, the flow-rate-ratio adjustment valve 28 is used. In the following description: a total EGR gas flow rate Gegr that is a flow rate of the EGR gas recirculated into the cylinders is referred to as "Gegr"; an EGR gas flow rate of the EGR gas that passes through the EGR cooler 24 is referred to as "GegrC"; and an EGR gas flow rate of the EGR gas that passes through the bypass passage 26 is referred to as "GegrCbp". According to the intake gas temperature control of the present embodiment, a ratio of the EGR gas flow rate GegrC with respect to the total EGR gas flow rate Gegr is defined as a flow rate ratio R, and the flow rate ratio R required for the actual intake gas temperature to approach the target intake gas temperature is calculated. Also, the operation amount (i.e., opening degree) of the flow-rate-ratio adjustment valve 28 is determined so as to achieve a calculated flow rate ratio R, whereby the intake gas temperature is controlled to the target intake gas temperature. Hereunder, the intake gas temperature control according to the present embodiment will be described in more detail.

According to the intake gas temperature control of the present embodiment, firstly, the EGR gas flow rates GegrC and GegrCbp required to achieve the target intake gas temperature are calculated by the use of the state quantities, such as the engine speed, the fresh air flow rate Ga suction into the cylinders, and the exhaust gas temperature of the gas discharged to the exhaust gas passage 14. Also, the flow rate ratio R that serves as a base value is calculated by the use of the following formula (1) that uses the EGR gas flow rates GegrC and GegrCbp that are calculated.

$$\text{Flow rate ratio } R = \text{GegrC}/(\text{GegrC} + \text{GegrCbp}) = \text{GegrC}/\text{Gegr} \quad (1)$$

Moreover, according to the intake gas temperature control of the present embodiment, the EGR gas flow rate GegrC is corrected by feedback control such that the actual intake gas temperature suctioned into the cylinders approaches the target intake gas temperature. More specifically, firstly, a correction amount Qfb of the EGR gas flow rate GegrC is calculated in accordance with the following formulas. It should be noted that, in the following formulas, a base proportional gain, a base integral gain and a base differential gain respectively denote a proportional term, an integral term and a differential term of the feedback control. In addition, a symbol "dTn" denotes a difference between the actual value of the intake gas temperature detected by the temperature sensor 32 and the target intake gas temperature. A calculated correction amount Qfb is added to the EGR gas flow rate GegrC. The EGR gas flow rate GegrC is thus corrected.

$$\text{Correction amount: } Qfb = QfbP_n + QfbI_n + QfbD_n \quad (2)$$

$$\text{Proportional term: } QfbP_n = \text{base proportional gain} \times dT_n \quad (3)$$

$$\text{Integral term: } QfbI_n = QfbI_{n-1} + \text{base integral gain} \times dT_n \quad (4)$$

$$\text{Differential term: } QfbD_n = \text{base differential gain} \times (dT_n - dT_{n-1}) \quad (5)$$

Figure 2:
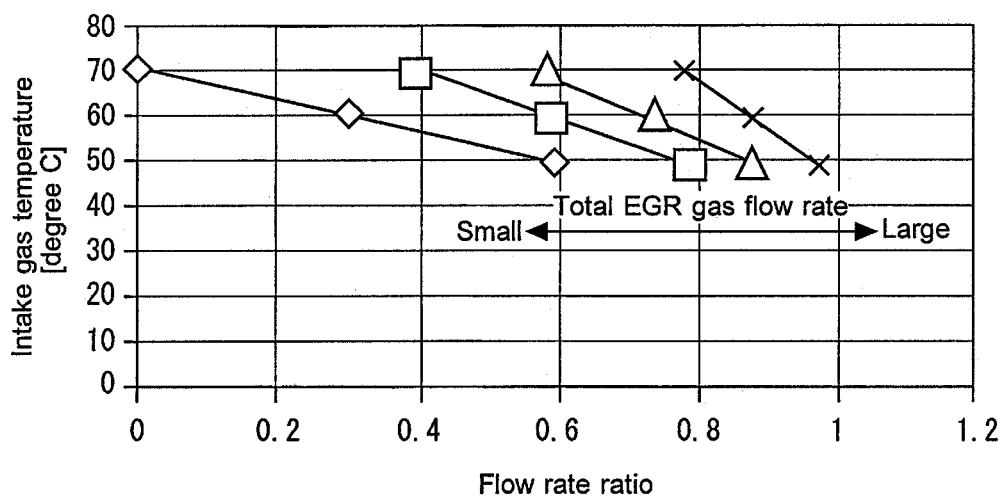
FIG. 2 is a graph that compares, for each EGR gas flow rate, changes of intake gas temperature with respect to a flow rate ratio R.

In relation to the feedback control performed in the intake gas temperature control, there is a problem described below. FIG. 2 is a graph that compares, for each total EGR gas flow rate, changes of the intake gas temperature with respect to the flow rate ratio R. As shown in FIG. 2, the larger the total EGR gas flow rate is, the higher the degree of change of the intake gas temperature with respect to the flow rate ratio R becomes. This is because, the larger the total EGR gas flow rate is, the higher the degree of effect of a temperature change of the EGR gas with respect to the intake gas temperature becomes. Thus, if, in the feedback control that uses the flow rate ratio R as its operation amount, the difference between the target intake gas temperature and the actual intake gas temperature is reflected to the flow rate ratio R by the use of constant control gains, the convergence of the intake gas temperature to the target gas temperature and the tracking performance of the intake gas temperature to the target intake gas temperature each become different depending on the actual total EGR gas flow rate. More specifically, if, for example, a control gain that is optimum when the total EGR gas flow rate is less is set, there is a concern that the operation amount may become too large when the total EGR gas flow rate is greater and that an excessive hunting of the intake gas temperature may occur as a result. Furthermore, if a control gain that is optimum when the total EGR gas flow rate is greater is set, there is a concern that a change of the operation amount may become slower when the total EGR gas flow rate is less, and that the convergence of the intake gas temperature may deteriorate as a result.

Figure 3:
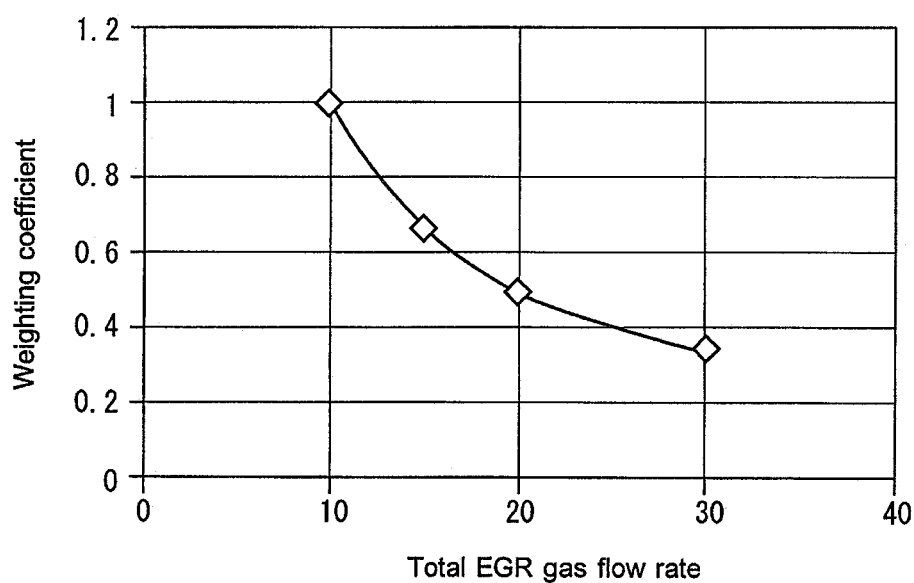
FIG. 3 is an example of a graph that represents a relationship between a weighting coefficient for each of control gains and the EGR gas flow rate.

Accordingly, in the intake gas temperature control according to the present embodiment, a weighting depending on the total EGR gas flow rate is performed with respect to the control gains of the feedback control. FIG. 3 is an example of a graph that represents a relationship between a weighting coefficient for each of the control gains and the total EGR gas flow rate. The weighting coefficient is a coefficient by which each of the control gains is multiplied. As shown in FIG. 3, the weighting coefficient is set to be smaller when the total EGR gas flow rate is greater, whereby the amount of change of the cooling efficiency is made smaller. According to this kind of control, since each of the control gains of the feedback control is set to be smaller when the total EGR gas flow rate is greater, variations of the convergence and tracking performance of the feedback control due to the difference of the total EGR gas flow rate can be reduced. This makes it possible to ensure the convergence and tracking performance of the feedback control in a broad range of the total EGR gas flow rate.

Figure 4:
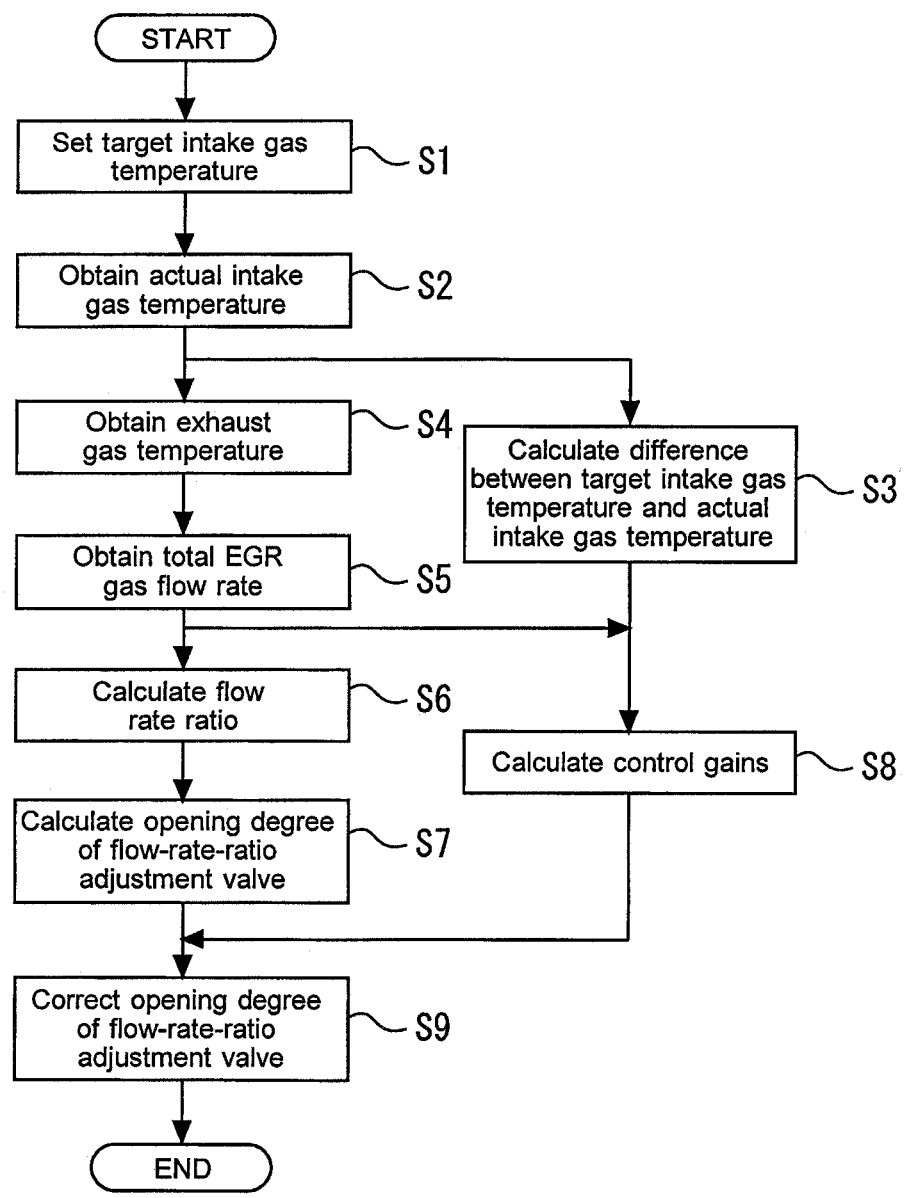
FIG. 4 is a flow chart used to perform an intake gas temperature control according to the first embodiment.

FIG. 4 is a flow chart used to perform the intake gas temperature control according to the first embodiment. A concrete processing of the intake gas temperature control performed in the present embodiment will be described with reference to FIG. 4. It should be noted that the routine shown in FIG. 4 is repeatedly executed by the ECU 30 at a predetermined control interval.

According to the routine shown in FIG. 4, firstly, the target intake gas temperature is set (step S1). As the target intake gas temperature, a proper temperature depending on the current operational state is arbitrarily set. Then, the actual value of the current intake gas temperature is detected by the use of the temperature sensor 32 (step S2). Next, the difference dTn between the target intake gas temperature that is set in step S1 and the actual intake gas temperature obtained in step S2 is calculated (step S3).

Next, the current exhaust gas temperature is obtained (step S4). In detail, the current exhaust gas temperature is estimated, by the use of a known method, from the state quantities, such as the engine speed, the fresh air flow rate Ga, the boost pressure and the intake gas temperature. Then, the total EGR gas flow rate is obtained (step S5). The total EGR gas flow rate is also estimated, by a known method, from various state quantities.

Next, the flow rate ratio R is calculated (step S6). To be more specific, the EGR gas flow rate GegrC required to achieve the target intake gas temperature is herein calculated from a map using various state quantities as its parameters. Then, the flow rate ratio R is calculated by substituting, into the formula (1) described above, the total EGR gas flow rate Gegr that is obtained in step S5 and the EGR gas flow rate GegrC that is calculated in this step S6. Next, the opening degree of the flow-rate-ratio adjustment valve 28 is calculated (step S7). In detail, the opening degree of the flow-rate-ratio adjustment valve 28 required to achieve the flow rate ratio R calculated in step S6 is herein calculated from a map.

Next, the control gains used in the feedback control of the intake gas temperature control are calculated (step S8). To be more specific, the weighting coefficient that corresponds to the total EGR gas flow rate estimated in step S5 described above is herein calculated from the map shown in FIG. 3. Then, the control gains used in the respective feedback terms are calculated by multiplying a calculated weighing coefficient by the respective base control gains of the proportional term, the integral term and the differential term. Next, the opening degree of the flow-rate-ratio adjustment valve 28 is corrected by the feedback control (step S9).

As just described, according to the system of the present embodiment, the weighting depending on the EGR gas flow rate is performed with respect to the control gains of the feedback control. This makes it possible to ensure the convergence and tracking performance of the feedback control that are stable within a broad EGR gas flow rate range.

Furthermore, in the system according to the first embodiment described above, a configuration is adopted such that the EGR gas flow rate GegrC concerning the EGR gas passing through the EGR cooler 24 is corrected by the feedback control. However, objects of correction by the feedback control are not limited to the foregoing, and an alternative configuration may be adopted such that the flow rate ratio R or the EGR gas flow rate GegrCbp concerning the EGR gas passing through the bypass passage 26 is corrected. In addition, the feedback control may not always be configured as described above, as long as it is configured by the use of any of the proportional term, the integral term and the differential term.

Second Embodiment

In the present embodiment, a description of parts common to those in the first embodiment will be omitted.

Figure 5:
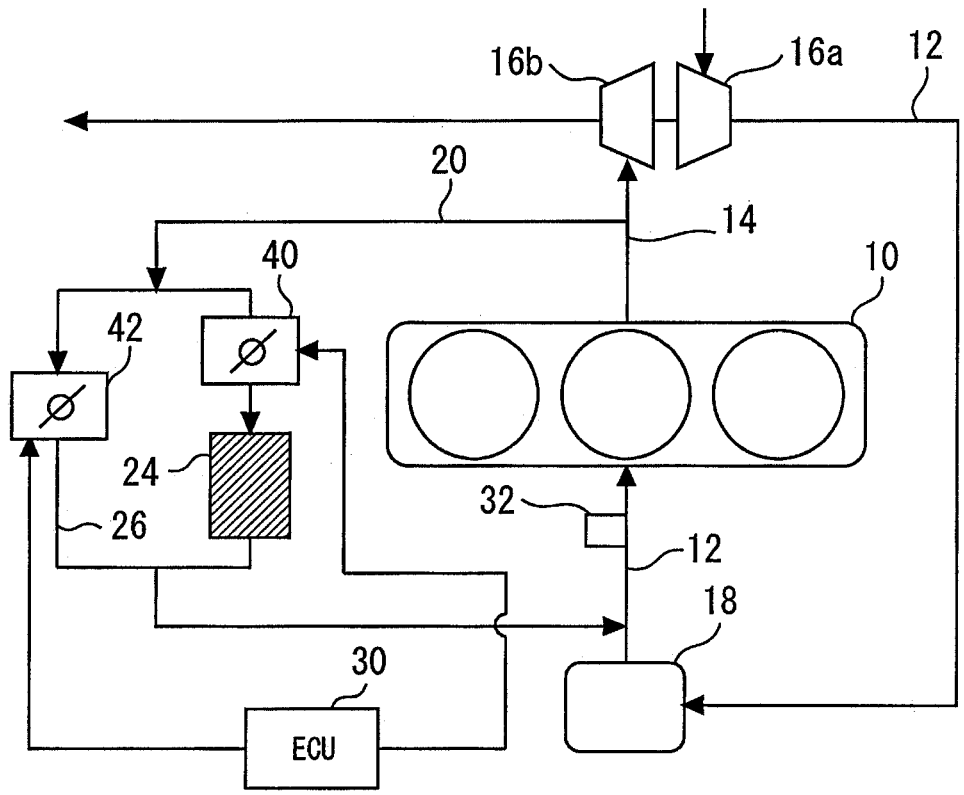
FIG. 5 is a diagram that illustrates the configuration of an engine system to which an exhaust gas recirculation system according to a second embodiment is applied.

FIG. 5 is a diagram that illustrates the configuration of an engine system to which the exhaust gas recirculation system according to the second embodiment is applied. According to the configuration of the system of the present embodiment, control valves 40 and 42 are provided instead of the EGR valve 22 and the flow-rate-ratio adjustment valve 28 according to the first embodiment. The control valve 40 is arranged at a portion of the EGR passage 20 located on the downstream side of a branch portion of the bypass passage 26 and on the upstream side of the EGR cooler 24. The control valve 40 can adjust the EGR gas flow rate GegrC concerning the EGR gas passing through the EGR cooler 24. Moreover, the control valve 42 is arranged at some point in the bypass passage 26, and can adjust the EGR gas flow rate GegrCbp concerning the EGR gas passing through the bypass passage 26.

According to the system shown in FIG. 5 configured as just described, by operating the control valves 40 and 42 such that the total EGR gas flow rate by the EGR control is achieved and the EGR gas flow rate GegrC that has been corrected by the feedback control is also achieved, a control similar to that of the first embodiment can be performed.

Figure 6:
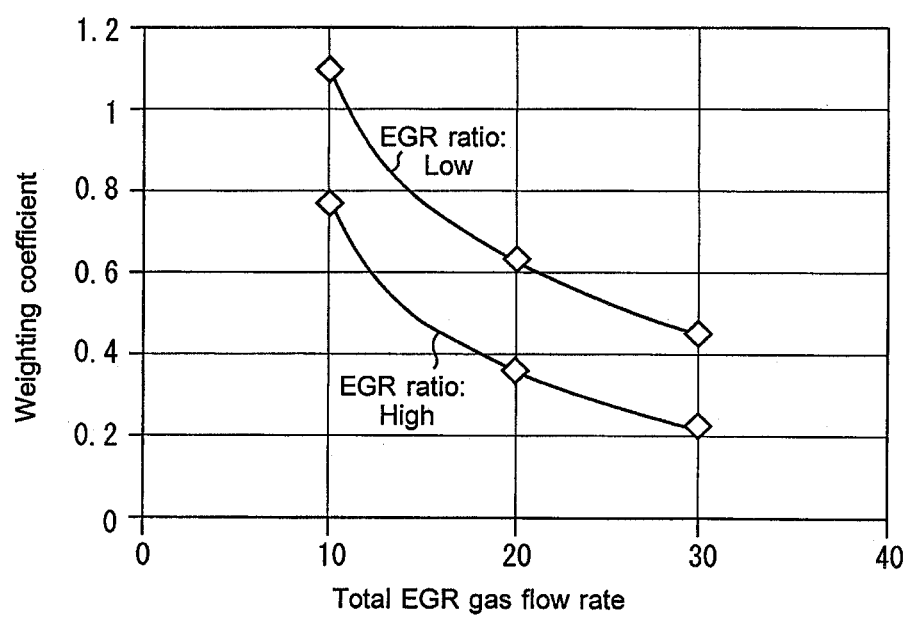
FIG. 6 is an example of a graph that represents a relationship between a weighting coefficient of each of the control gains, the EGR gas flow rate, and an EGR ratio.

It should be noted that, although, in the systems according to the first and second embodiments described above, the EGR gas flow rate GegrC concerning the EGR gas passing through the EGR cooler 24 is corrected on the basis of the total EGR gas flow rate, the EGR gas flow rate GegrC may be corrected with also taking into consideration the EGR ratio. FIG. 6 is an example of a graph that represents a relationship between a weighting coefficient of each of the control gains, the total EGR gas flow rate, and the EGR ratio. As shown in FIG. 6, a configuration may be adopted such that the weighting coefficient is set to be smaller when the EGR ratio is higher. This is because, even if the total EGR gas flow rate is constant, the degree of effect of a temperature change of the EGR gas with respect to the intake gas temperature becomes higher when the EGR ratio is higher. In an example of a concrete method of obtaining the EGR ratio, the current EGR ratio is estimated in accordance with the following formula (6) that uses the current fresh air flow rate Ga and the total EGR gas flow rate Gegr.

$$\text{EGR ratio} = Gegr/(Ga+Gegr) \times 100 \tag{6}$$

Moreover, in the systems according to the first and second embodiments described above, the temperature sensor 32 is used to obtain the intake gas temperature. However, the intake gas temperature may alternatively be estimated, by the use of a known method, on the basis of the operational state of the internal combustion engine 10. Also, methods of obtaining the total EGR gas flow rate and the EGR ratio are not limited to the method described above, and they each may be detected directly by the use of, for example, sensors or be estimated by the use of other sensors.

Furthermore, in the systems according to the first and second embodiments described above, the intake gas temperature is controlled with a high accuracy by correcting the EGR gas flow rate GegrC concerning the EGR gas passing through the EGR cooler 24. However, in a system that does not include the bypass passage 26, the cooling efficiency of the EGR cooler 24 itself may be corrected on the basis of the total EGR flow rate. More specifically, a configuration may be adopted such that the cooling efficiency of the EGR cooler 24 itself is corrected by correcting, on the basis of the total EGR gas flow rate, the flow rate of cooling water supplied to the EGR cooler 24.

What is claimed is:

1. An exhaust gas recirculation system for an internal combustion engine, the exhaust gas recirculation system comprising:
   an EGR passage configured to connect an exhaust gas passage of the internal combustion engine with an intake air passage;
   an EGR cooling system arranged at the EGR passage; and
   a control device configured to control the EGR cooling system,
   wherein the control device is configured to provide feedback control of a cooling efficiency of the EGR cooling system to cause a temperature of intake gas suctioned into a cylinder of the internal combustion engine to approach a target intake gas temperature, and
   wherein the control device is configured to increase an amount of change of the cooling efficiency by a greater amount when a flow rate of EGR gas recirculated is lower.

2. The exhaust gas recirculation system according to claim 1,
   wherein the control device is configured to increase a control gain of the feedback control by a greater amount when the flow rate of the EGR gas recirculated is lower.

3. The exhaust gas recirculation system according to claim 1,
   wherein the EGR cooing system includes:
   an EGR cooler;
   a bypass passage configured to bypass the EGR cooler; and
   a flow-rate-ratio adjustment valve configured to adjust a flow rate ratio of a flow rate of a gas flowing through the EGR cooler and a flow rate of a gas flowing through the bypass passage, and wherein the control device is configured to provide the feedback control of the cooling efficiency by providing feedback control of an opening degree of the flow-rate-ratio adjustment valve to cause the temperature of the intake gas suctioned into the cylinder to approach the target intake gas temperature.

4. The exhaust gas recirculation system according to claim 1,
wherein the control device is configured to increase the amount of change of the cooling efficiency by a greater amount when an EGR ratio is lower.

* * * * *